(12) United States Patent
Amatucci

(10) Patent No.: US 6,517,972 B1
(45) Date of Patent: Feb. 11, 2003

(54) HIGH ENERGY DENSITY HYBRID BATTERY/SUPERCAPACITOR SYSTEM

(75) Inventor: Glenn Amatucci, Peapack, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 176 days.

(21) Appl. No.: 09/650,364

(22) Filed: Sep. 29, 2000

(51) Int. Cl.[7] .............................. H01M 4/58; H01G 9/00
(52) U.S. Cl. ............................... 429/231.1; 429/231.9; 429/231.95; 429/231.8; 429/9; 361/582; 361/503
(58) Field of Search .................. 429/231.8, 231.95, 429/231.9, 231.1, 9; 361/503, 502, 504–512

(56) References Cited

U.S. PATENT DOCUMENTS 5,419,977 A * 5/1995 Weiss et al. .................. 429/7
6,228,516 B1 * 5/2001 Denton, III et al. ............ 429/7
6,252,762 B1 * 6/2001 Amatucci ................... 361/503

* cited by examiner

Primary Examiner—Carol Chaney
Assistant Examiner—Angela J Martin
(74) Attorney, Agent, or Firm—David A. Hey

(57) ABSTRACT

A rechargeable hybrid battery/supercapacitor electrical storage system capable of providing high energy and high power densities comprises a negative intercalation electrode (17) and a positive capacitor electrode (13) comprising an anion-adsorbing component and a cation-intercalating material combined with a separator (15) and electrically-conductive current collector elements (11, 19) to form a unitary cell structure (10). An electrolyte solution of a dissociable salt absorbed into the porous structure of the separator (15) provides complementary ion species which, supplemented by cations supplied from the positive electrode intercalation material in order to increase the energy density capability of the system, respectively reversibly intercalate into the negative electrode (17) and capacitively adsorb at the surface of the positive electrode (13) upon the application of charging current. The high density stored electrical energy may be rapidly recovered at high power over extended periods upon demand of a utilizing device and may be equally rapidly restored to stable high energy capacity through numerous charging cycles.

20 Claims, 3 Drawing Sheets

HIGH ENERGY DENSITY HYBRID BATTERY/SUPERCAPACITOR SYSTEM

BACKGROUND OF THE INVENTION

The present invention relates to electrical energy storage systems which may be recharged over numerous cycles to provide reliable power sources for a wide range of electrical utilization devices. The invention is directed in particular to a rechargeable storage system which is capable of exhibiting both high energy density normally associated with batteries, and high power density and long operative life typical of supercapacitors.

In the present invention, such a system comprises a multi-layer energy storage device structure which incorporates respective positive and negative electrode elements comprising pseudocapacitor or double-layer supercapacitor materials and rechargeable intercalation battery materials in a unitary, flexible structure which may be sized and shaped as desired to be most compatible with utilization devices while providing advantageously high energy and power densities.

Modern applications requiring mobile electrical energy sources, ranging from personal telecommunications devices to electric vehicles, are proliferating at an exponential rate. The demands of these applications range widely, for example, in voltage or power level, but all are preferably served by light-weight storage devices which can rapidly provide consistently high energy density over long time spans and can be quickly recharged to operational energy levels. Commercially, these extensive mobile energy needs are being met, in a fashion, by one or the other of the two available types of storage devices, viz., rechargeable batteries, such as lithium-ion intercalation systems, or supercapacitors of either faradic pseudocapacitive or non-faradic double-layer reaction type.

The choice between these battery or supercapacitor systems is normally dictated by the more pressing of the application's demand for high energy density, available from batteries, or for the rapid delivery of high power, provided by supercapacitors. Attempts to meet requirements for both high energy and high power densities in a single application have led in some instances to the utilization of both device types arranged together in such a manner that the battery is available to recharge the supercapacitor between periods of high power demand. The disadvantage of such a practice in the excessive weight factor alone is clearly apparent. Additional limitations on this expedient are reflected in the time requirement for battery charging, as well as in the multiplicity of cells and in battery life cycle which may often be shortened by the physical rigors of the intercalation battery charging operation.

Recently, inroads have been made toward meeting the requirements of mobile electrical energy utilization in a hybrid system which combines the desirable characteristics of both the battery and the supercapacitor in a single integrated device of light weight and extended energy capacity. Comprising opposing electrodes of, for example, an activated carbon supercapacitor element and an intercalation composition battery element, particularly a transition metal oxide spinel material having a structure which exhibits rapid ion diffusion and little physical distortion from intercalation, such a hybrid system is able to exhibit a higher energy storage capability more typical of batteries as well as the high speed power delivery and exceptional cycle life of supercapacitors. The present invention represents an improvement upon this hybrid system, particularly in enabling a manyfold increase in achievable energy density without loss of contemporary high power density and rapid cycling capability.

SUMMARY OF THE INVENTION

A hybrid battery/supercapacitor system embodying the improvement of the present invention comprises, in essence, negative and positive electrode members with an interposed insulative ion-transmissive separator member containing a fluid electrolyte. These functional members are preferably in the form of individual layers or membranes laminated together to form a flexible, unitary structure.

The negative "battery" electrode member layer comprises a composition of a material capable of reversibly intercalating cation species, preferably comprising a spinel compound dispersed in a polymeric matrix of, for example, a copolymer of poly(vinylidene fluoride-co-hexafluoropropylene). To provide low resistance electrical current conduction between electrodes, the battery layer may be laminated, e.g., by thermal means, to a conductive current collector element, such as a reticulated metal foil.

The positive "supercapacitor" counter-electrode member layer may be similarly combined with a current collector foil and preferably comprises a copolymer matrix composition of activated carbon and, in accordance with the present invention, an added intercalation material, such as a spinel compound, incorporating a reversibly intercalated cation species.

The separator member interposed between the electrode members may comprise any of the previously employed high-porosity, microporous, or absorptive polymer film layers or membranes within which is dispersed a solution of electrolyte salt comprising an intercalatable cation, e.g., 1 M solution of $LiPF_6$ in a mixture of 2 parts ethylene carbonate and 1 part dimethyl carbonate. Such an electrolyte ensures essential ionic conductivity and mobility within the system structure. In the present invention this mobility serves the notable purpose of enabling the rapid flow of both ion species of the electrolyte salt to and from the respective electrodes during charging and discharging of the device.

In the hybrid system of the present invention, as in the operation of the prior hybrid system, the cation migration to intercalation within the negative electrode during a charging cycle, the action which normally serves as the sole mode of energy storage in rechargeable intercalation battery systems, is augmented by anion migration from the electrolyte to the positive electrode surface to effect an additional anion-adsorptive capacitive charging, e.g., of the non-faradic double-layer type. The combined effect of faradic intercalation battery charging and non-faradic capacitor charging rapidly builds an effective energy density which may be recovered at an equally rapid rate, e.g., about an order of magnitude faster than achievable in a typical Li-ion battery, to yield high power density upon application demand. Unfortunately however, the ultimate energy density levels of such earlier hybrid system have lagged by a factor of about three those of rechargeable Li-ion batteries.

During attempts to formulate a hybrid system capable of yielding improved energy densities approaching those of the rechargeable Li-ion battery systems, it was surprisingly discovered that the sought improvement could be realized by the addition of a lithiated intercalation material to the activated carbon positive electrode composition in a lithium cation electrolyte hybrid system. This advantageous result apparently derives from the additional $Li^+$ ions which are provided by the positive electrode intercalation composition during the charging cycle of the system and which supplement the Li$^+$ ions normally available from the dissociated electrolyte solute for energy storage intercalation into the composition of the negative electrode. The redox activity in the intercalation of the supplemental Li$^+$ ions at the positive electrode during desorption of the electrolyte anions thereafter provides the additional electron flow yielding the exceptionally higher energy density levels which have been seen to exceed those of popular NiCd and NiMeH cells, as well.

The hybrid system of the present invention, as did the earlier hybrid system upon which it has improved, can utilize most of the respective compositions of known rechargeable intercalation batteries and supercapacitor devices, such as are typically represented, e.g., in U.S. Pat. Nos. 5,418,091 and 5,115,378. As in these earlier systems, intercalating electrode materials may comprise metallic sulfides, oxides, phosphates, and fluorides, open-structured carbonaceous graphites, hard carbons, and cokes, and alloying materials, such as aluminum, tin, and silicon. Similarly, surface-active capacitor materials, typically high surface area closed-structure activated carbon powders, foams, fibers, and fabrics may be used in the counter-electrodes. The active electrolyte component of the present hybrid system may likewise be formulated of prior available materials, with particular utility being enjoyed in the non-aqueous solutions of intercalatable alkali and alkaline earth cations, usually incorporated in significantly fluid form in fibrous or polymer matrix containment materials, thus maintaining an environment conducive to mobility of both species of electrolyte ions. The laminated polymeric layer format typified by the secondary batteries described in U.S. Pat. No. 5,460,904 and related publications serves well for the structures of the present invention.

BRIEF DESCRIPTION OF THE DRAWING

The present invention will be described with reference to the accompanying drawing of which.

DESCRIPTION OF THE INVENTION

Figure 1:
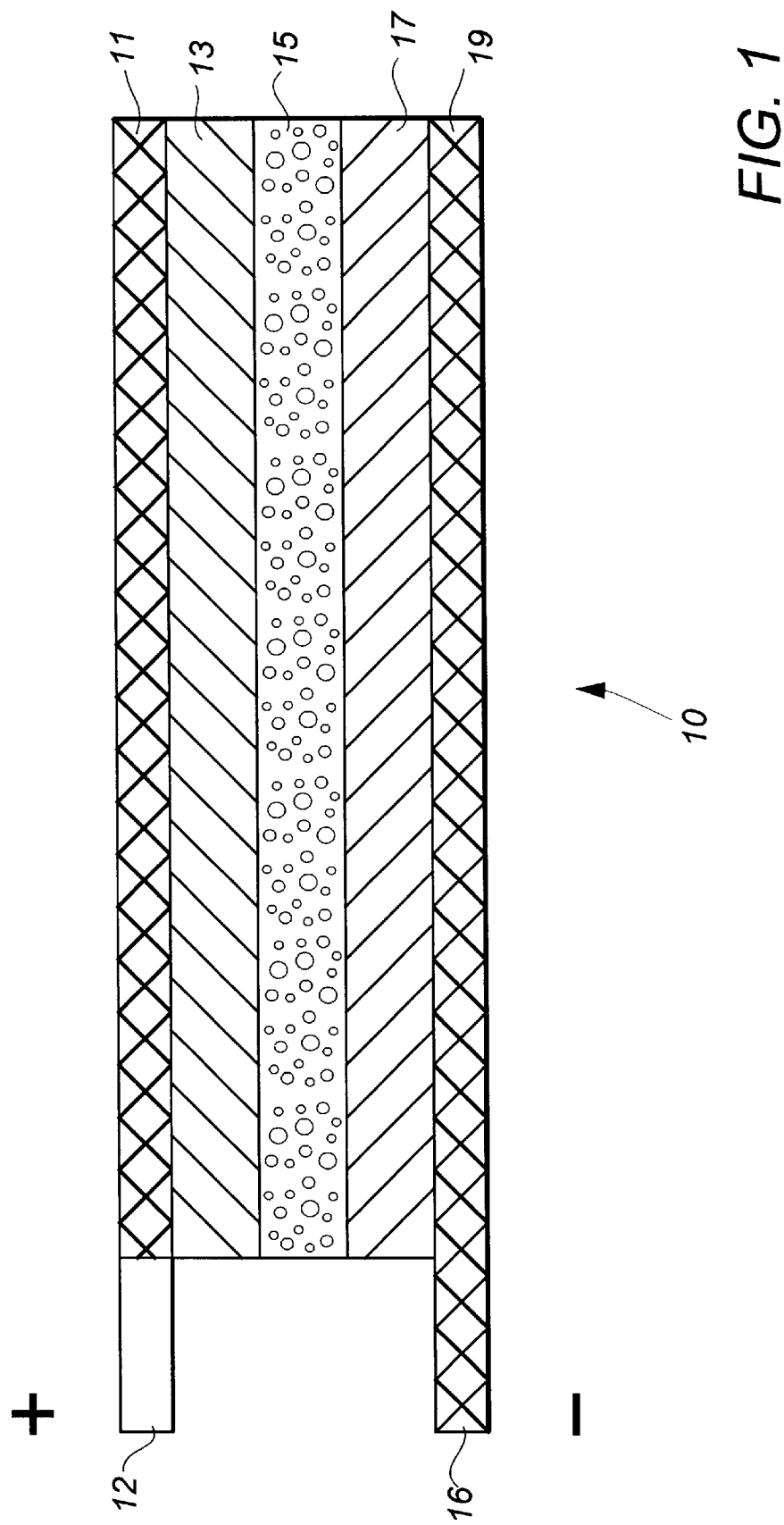
FIG. 1 is a diagrammatic representation in cross-sectional elevation of a laminated hybrid battery/supercapacitor system cell structure of the present invention.

A laminated hybrid battery/supercapacitor structure 10 typical of the present invention is generally depicted (not to scale) in FIG. 1 and includes a positive electrode member comprising a current collector foil 11, preferably in the form of an open mesh aluminum grid with an extending terminal tab 12, which has been laminated under heat and pressure to electrode element layer 13 comprising a composition of activated carbon and intercalation compound, e.g., a mixture of the finely divided carbon and LiMn$_2$O$_4$ components in a polymeric binder matrix. The activated carbon may alternatively be incorporated in such other available forms as carbon fiber fabric or carbon foam.

A negative electrode member comprises a current collector foil 19, preferably in the form of a open mesh copper grid having a terminal tab 16, similarly laminated to an intercalation electrode element 17 comprising an intercalation compound, such as a preferred spinel, Li$_4$Ti$_5$O$_{12}$, dispersed a polymeric matrix. Any of the numerous other intercalation materials, such as those mentioned in the noted publications, routinely employed in rechargeable Li-ion batteries are entirely satisfactory for use in active compositions for the negative electrode of the present system.

A separator member comprising a membrane 15 of, for example, an ultra-high molecular weight micro-fibrillar polyolefin, a hyperporous copolymeric membrane, or other type of inert electron-insulating, ion-transmissive medium capable of absorbing electrolyte solution is interposed between electrode elements 13, 17 of the composite electrode members. The separator member of the system is preferably at least partially of thermoplastic or thermoadhesive composition in order to facilitate lamination by the application of heat and pressure to soften the surfaces of the separator membrane and effect its firm bonding to the system electrodes.

Upon completion of the laminated cell structure, electrolyte solution of the type earlier described may be applied for a time sufficient to allow its absorption into the porous structure of separator 15 in order to provide the essential ion mobility within the system. Preferred electrolytes comprise non-aqueous solutions of dissociable salts providing intercalatable cation species, such as alkali, e.g., Li$^+$, alkaline earth, e.g., Mg$^{++}$, lanthanide, Y$^{+++}$, Al$^{-++}$, or Zn$^{++}$moieties. These electrolytes likewise provide for operation of the system such complementary anion species as PF$_6^-$, BF$_4^-$, or ClO$_4^-$.

A representative embodiment of the present invention may be more particularly fabricated and employed as shown in the following examples.

EXAMPLE 1

A separator membrane 15 is prepared in the manner which has served successfully in the fabrication of rechargeable Li-ion batteries, such as described in the earlier-noted patent specifications. In particular, the membrane is cast from a composition comprising a solution of 6 g of 88:12 poly (vinyl-idene fluoride-co-hexafluoropropylene) (VdF:HFP) copolymer of about 380×10$^3$ MW (available commercially from Atochem North America as Kynar FLEX 2801) and 10 g of a compatible organic plasticizer, propylene carbonate (PC), in about 40 g of acetone. An additional 4 g of powdered fumed silica is dispersed into the solution in a mechanical blender, and the composition is cast and dried to a flexible membrane of about 0.075 mm thickness. The composition may comprise alternative plasticizers, such as dimethyl phthalate, diethyl phthalate, or tris butoxyethyl phosphate, and other inorganic filler adjuncts, such as fumed alumina or silanized fumed silica, may be used to enhance the physical strength of the separator membrane and, in some compositions, to increase the subsequent level of electrolyte solution absorption.

EXAMPLE 2

A positive electrode coating composition embodying the improvement of the present invention is prepared by suspending 5.25 g of a high surface area (1500 m²/g) activated carbon powder in a solution of 2.5 g of 88:12 VdF:HFP copolymer (Atochem Kynar FLEX 2801) and 3.5 g of propylene carbonate plasticizer (PC) in about 40 g of acetone. To this slurry is added 1.75 g of sub-micron pulverized $LiMn_2O_4$ spinel intercalation material. The mixture is stirred in a mechanical blender for about 10 minutes to ensure homogeneity and is then cast and allowed to dry in air at room temperature for about 1 hour. The resulting tough, flexible composite supercapacitor electrode membrane 13 is readily cut to desired test cell size of about 50 mm×80 mm. An aluminum open mesh grid about 50 μm thick, e.g., a MicroGrid precision expanded foil marketed by Delker Corporation, is cut to form a current collector element 11 (FIG. 1) of about 50 mm×100 mm and placed in face contact with membrane 13 so as to provide an extending collector terminal tab 12 of about 20 mm. This assemblage is passed between rollers heated to about 125° C. at a pressure of about 45 N per linear cm of roller contact where the polymeric electrode composition of membrane 13 is softened sufficiently to penetrate the open mesh of the grid collector 11 and establish a bond which firmly embeds the collector to form a unitary positive electrode member.

EXAMPLE 3

A negative intercalation electrode membrane is similarly prepared from a casting composition comprising a suspension of 7 g of pulverized $Li_4Ti_5O_{12}$ and 0.5 g of Super-P conductive carbon powder in a solution of 2.5 g of the VdF:HFP copolymer of Example 1 and 3.5 g of PC in about 40 g of acetone. A 50 mm×80 mm electrode membrane 17 is likewise laminated to a current collector 19 of Microgrid expanded copper foil having an extending terminal tab 16. In preparing this electrode member and the counter-electrode of Example 2 care is taken to provide a reasonable balance in the respective amounts of active capacitor and intercalation materials comprising the final electrodes. Such a balance is based upon the predetermined energy storage capacity of the respective electrodes and is effected primarily by adjusting the cast thickness of the membranes. Thus, in these examples where the negative intercalation electrode provides the higher specific capacity, viz., about 150 mAh/g as compared to the 30 mAh/g of the positive capacitive charging electrode, that negative electrode membrane may be cast at a thickness providing the spinel at about 20% of the mass of the positive electrode mixed activated carbon/intercalation compound composition.

EXAMPLE 4

To complete the fabrication of a unitary hybrid battery/supercapacitor cell device embodying the present invention, the respective positive and negative electrodes members prepared in Examples 2 and 3 are arranged with an interposed separator membrane of Example 1, and the assemblage is laminated in the previous manner using a heated roller apparatus, such as a commercial card laminator, at a temperature of about 135° C. In order to avoid short-circuiting in the device, terminal tabs 12, 16 of the collector elements are formed from laterally spaced portions of grids 11, 19.

The final operation in the fabrication process entails activation of the hybrid cell device by addition of electrolyte solution in order to achieve ionic conductivity and to provide a sufficient reservoir of ion species to maintain the charge/discharge cycle activity. In this respect it should be noted that the present system, in the manner of prior hybrid system, utilizes not only the electrolyte cation species, e.g., $Li^+$, as an active charge transfer medium during reversible intercalation at the negative electrode, but also employs the anion species, e.g., $PF_6^-$, which effects charge storage in double-layer supercapacitor reactivity at the positive electrode. Thus, whereas one or the other of the intercalating electrodes of prior rechargeable battery systems could represent a source of cations, the electrolyte, although now supplemented by the additional lithiated intercalation component of the positive electrode composition, serves as the primary source of both ion species in the present hybrid system. It therefore remains important to provide sufficient electrolyte to enable full and repeated charging over periods of extended cycling. Considering that the added lithiated intercalation component, as well as providing further $Li^+$ ions during charging, supplements the anionic reactivity at the positive electrode, a useful measure of such electrolyte is an excess of about 2 to 4 times stoichiometric amounts.

Sufficient such activation of cells having structures comprising separator members of preformed hyperporous films, microfibrillar membranes, or fibrous mats, such as 0.5 mm Whatman borosilicate fiber filter sheet, may be readily achieved by simple saturation of the separator with electrolyte solution. With cell structures of the present exemplary type comprising electrode and separator members of plasticized polymer composition, the addition of electrolyte is preferably accomplished through application of an electrolyte solution after extraction of the plasticizer from the copolymer composition of the structure by immersing the laminated cell structure 10 of FIG. 1 in a solvent for the plasticizer which has significantly little affect on the copolymer matrix material. For the described VdF:HFP copolymers, such a solvent may be diethyl- or dimethyl ether, methanol, hexane, or the like. The microporous structure formed throughout separator membrane 15 by moderately slow evaporation of the extraction solvent provides the laminated cell 10 with an abundance of sites for retention of any of the non-aqueous electrolyte solutions commonly employed in prior secondary polymeric batteries and supercapacitors.

Notably, there may be employed in the electrolyte solution such organic solvents as propylene carbonate, diethoxyethane, diethyl carbonate, dimethoxyethane, sulfolane, and dipropyl carbonate and mixtures thereof. Also, in the formulation of the activating electrolyte solutions, useful lithium salts include $LiClO_4$, $LiN(CF_3SO_2)_2$, $LiBF_4$, $LiCF_3SO_3$, and $LiAsF_6$ which may be employed in solution concentrations of between about 0.5 and 2 M. Of particular utility are the exceptional ethylene carbonate/dimethyl carbonate compositions of $LiPF_6$ and mixtures with $LiBF_4$ described in U.S. Pat. No. 5,192,629.

EXAMPLE 5

In preparation for using such an electrolyte, laminated polymeric cell structure 10 of Example 4 is immersed in a body of diethyl ether where, under mild agitation for about 10 minutes, the PC component of the electrode and separator membrane compositions is extracted. After removal from the extracting bath and air-drying at room temperature, the cell is activated under a moisture-free atmosphere by immersion in a 1 M electrolyte solution of $LiPF_6$ in a 2:1 mixture of ethylene carbonate (EC):dimethyl carbonate (DMC) for about 10 minutes during which it imbibes the electrolyte solution into the microporous laminate structure to substantially replace the original DBP plasticizer. Following a mild wiping with absorbent material to remove surface electrolyte, the activated battery/supercapacitor cell 10 is hermetically sealed, but for the extending terminal tabs 12, 16, within a polyolefin envelope (not shown) to maintain a moisture-free environment.

EXAMPLE 6

As a counter-example for comparison with the foregoing embodiment of the present invention, a hybrid cell of the prior art is prepared utilizing the separator and negative electrode members of Examples 1 and 3 in like combination with a positive supercapacitor membrane 13 consisting essentially of activated carbon as the functional component. The casting composition for this single component positive electrode is thus prepared in the manner of Example 2 with the exception of solely comprising 7 g of the activated carbon powder dispersed in the solution of 2.5 g VdF:HFP copolymer, 3.5 g of PC, and 40 g of acetone. The dried cast activated carbon membrane is laminated to a like current collector element 11 and the resulting positive capacitive charging electrode member is incorporated according to Example 4 into a rechargeable hybrid cell structure which is activated with electrolyte as in Example 5 to enable cycling operation.

EXAMPLE 7

Figure 2:
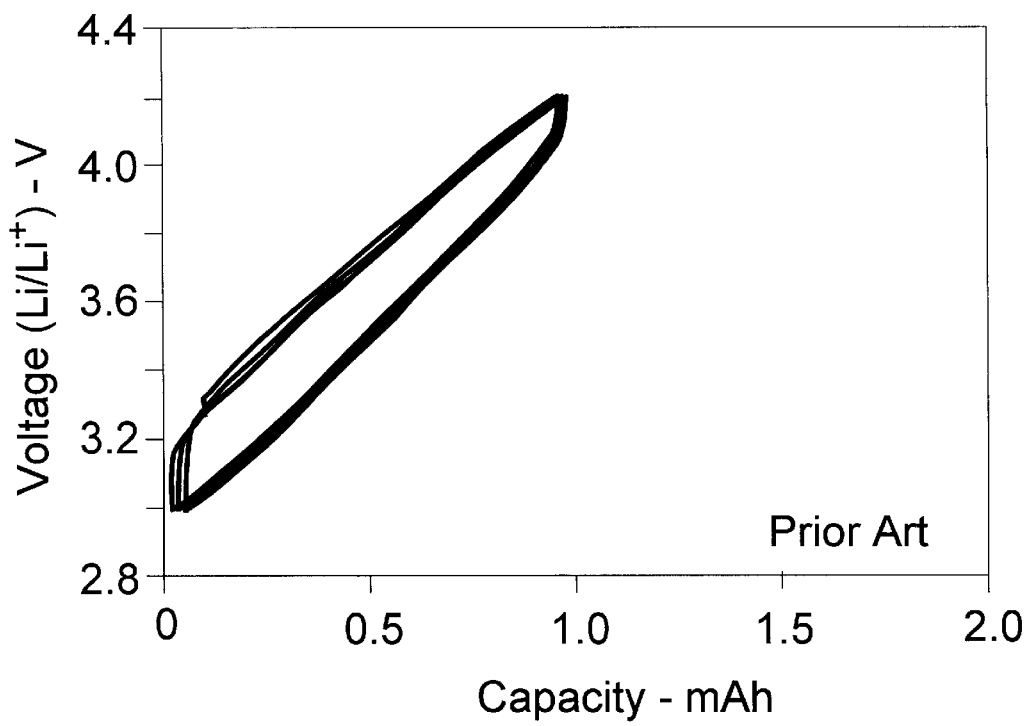
FIG. 2 is a graphical representation of characteristic voltage and capacity of a cycling rechargeable hybrid battery/supercapacitor system of the prior art.

The prior art hybrid rechargeable cell of Example 6 is subjected to repeated charge/discharge cycles at a 2C rate (full cycle of 30 min) over the range of 3.0 V to 4.2 V (relative to the Li/Li$^+$ couple) in the usual manner under the control of automated test equipment. From accumulated operational data the testing device produces the characteristic trace of FIG. 2 depicting the energy density capacity and stability of the cell as a function of charge voltage.

EXAMPLE 8

Figure 3:
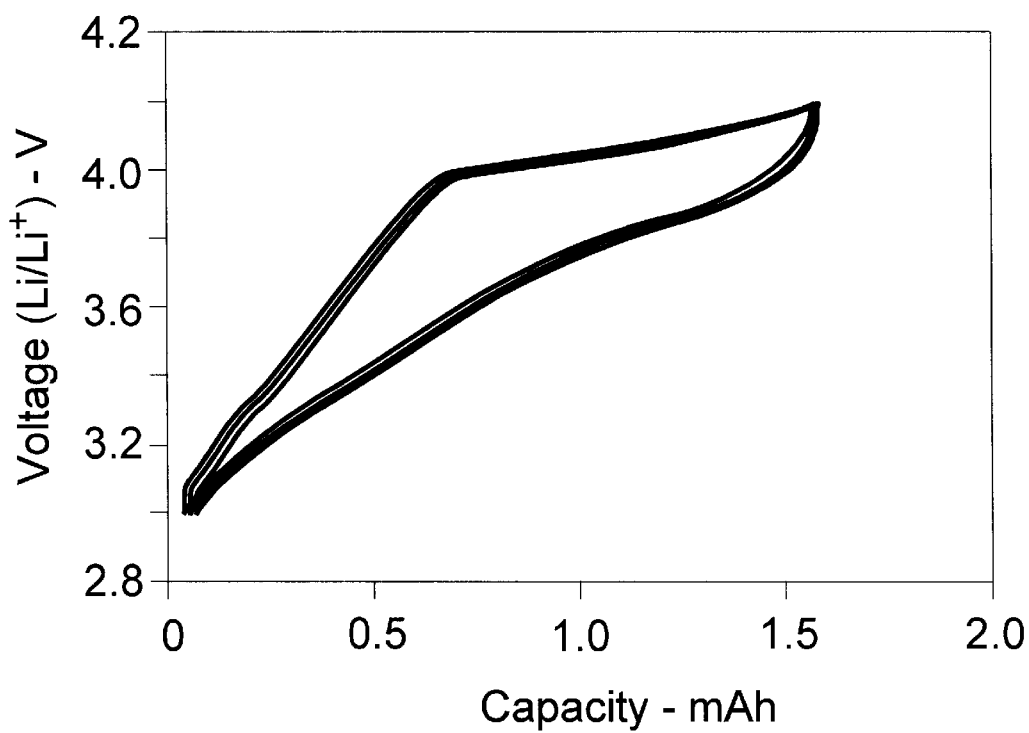
FIG. 3 is a graphical representation of characteristic voltage and capacity of a cycling rechargeable hybrid battery/supercapacitor system of the present invention.

The hybrid composite positive electrode embodiment test cell of Example 5 is cycled in the previous manner with depicted voltage/capacity characteristics, as shown in FIG. 3, indicating a nearly 50% increase in cell capacity as a result of the substitution of about 25% intercalation compound in the activated carbon capacitive electrode composition.

EXAMPLE 9

Figure 4:
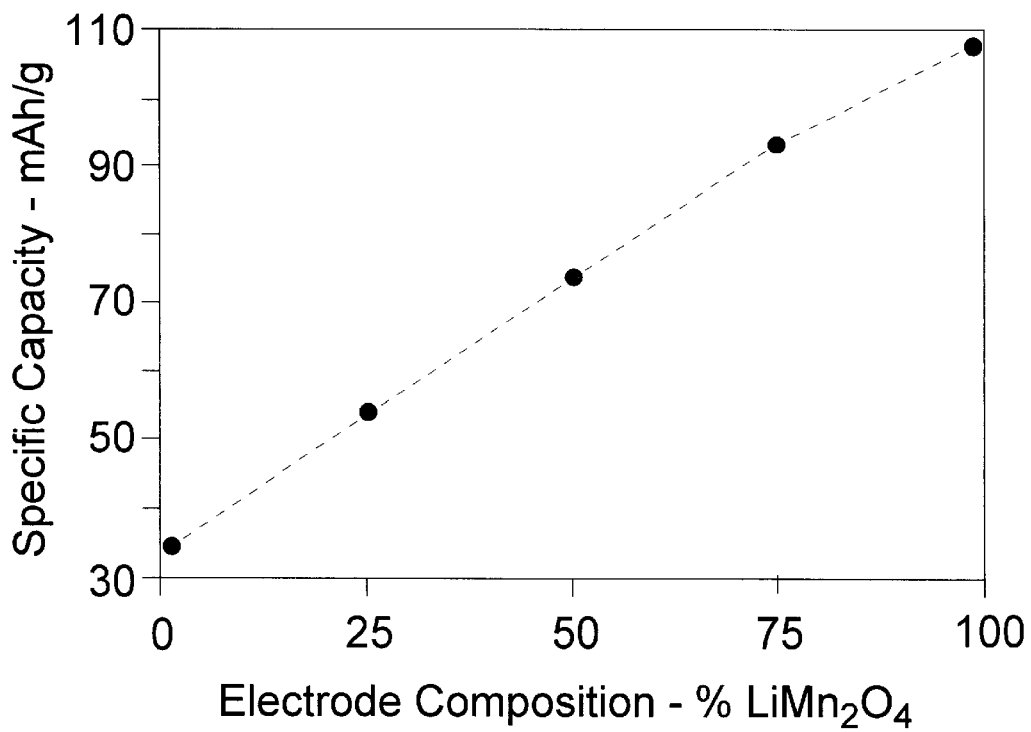
FIG. 4 is a graphical representation of the variation in specific capacity as a function of positive electrode composition of a hybrid battery/supercapacitor system cell of the present invention.

A series of test cells prepared in the manner of Example 5 with positive electrode compositions varying in the proportion of lithiated intercalation compound additive is similarly subjected to repeated cycling tests the data of which provided an indication of the specific capacity of the respective cells as a function of such intercalation compound proportion. These results are depicted in FIG. 4 and show the generally regular increase in energy density, or specific capacity, of these hybrid cells as their positive electrode composition increases in intercalation component toward that of a typical Li-ion intercalation battery cell.

EXAMPLE 10

Figure 5:
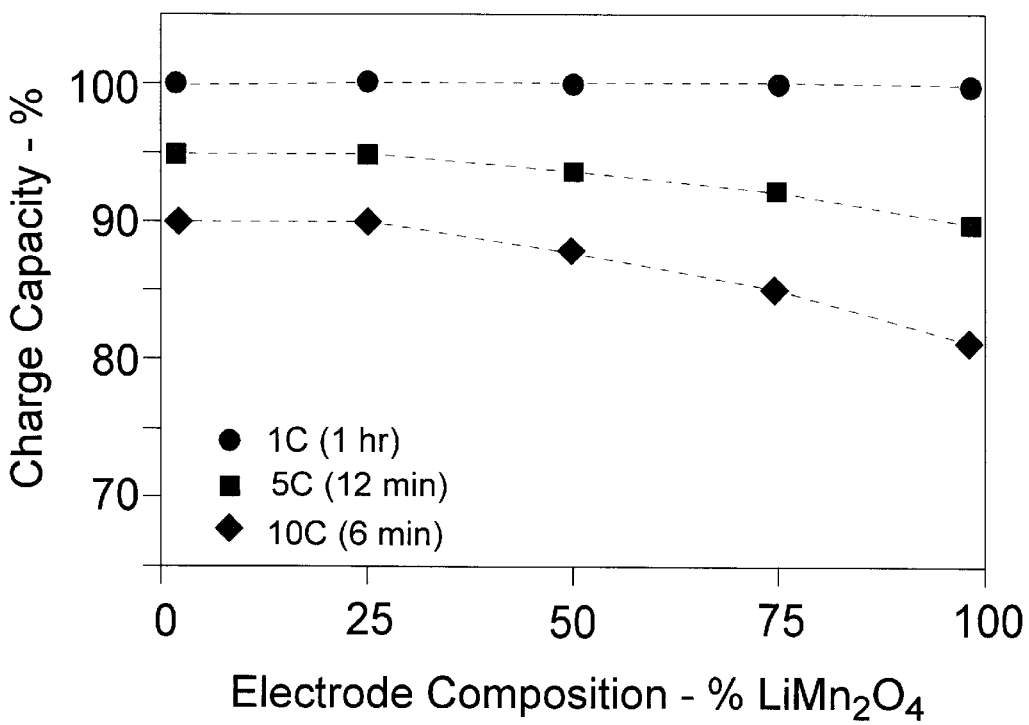
FIG. 5 is a graphical representation of charge capacity retention at various cycling rates as a function of positive electrode composition of a hybrid battery/supercapacitor system cell of the present invention.

As earlier noted, a significant advantage of the hybrid supercapacitor/intercalation cell over the typical intercalation battery cell lies in the rapidity with the hybrid cell may be charged and discharged while nonetheless maintaining high operative performance levels. In order to determine the affect on this advantageous property of intercalation compound addition to the composition of the capacitive positive electrode, the test cell series of Example 9 is subjected to increasing cycling rates to about ten cycles per hour (10C), or a 6 min full cycle. The results of these tests are depicted in FIG. 5 which indicate that the effective performance, shown as retention of charge capacity, of the various compositions is little affected at a low cycling or operation rate, but does decrease noticeably with composition as such rate increases. Of particular note, however, is the ability to improve the capacity of the hybrid cell without significant loss of operational capability at any cycling rate with additions to the positive electrode composition of up to about 25% intercalation compound.

The present invention is not limited to the compositions outlined above, since other intercalation materials may be employed with varying degrees of success in the negative electrodes of these improved hybrid cells. Such materials include sulfides, such as $TiS_2$, $FeS_2$, and $ZrS_2$; oxides, such as $MnO_2$, $LiMn_2O_4$, $MoO_3$, $WO_3$, $TiO_2$, $Co_3O_4$, $Fe_2O_3$, and $Cr_3O_8$; phosphates, such as $LiFePO_4$ and $LiMnPO_4$; fluorides, such as $FeF_2$ and $FeF_3$; open-structured carbonaceous materials, such as graphite, coke, and hard carbon; and alloying metals and compounds, such as Al, Sn, $SnO_2$, and Si. Further, any such materials as transition metal oxide intercalation compounds which are capable of deintercalating cation species under applied charging current serve particularly well for supplementing the activated carbon in fabrication of the present improved positive electrode members. Such positive electrodes, in addition to comprising intimate component mixtures, may also be formulated by contiguous arrangement or lamination of layers of the carbon and intercalation materials, such as a layer of activated carbon fabric laminated to a polymeric membrane comprising $LiCoO_2$.

As alternatives to the exemplary polymeric separator membranes, polyolefin and other polymeric microporous and microfibrillar treated and untreated separator membranes materials are particularly preferred. It has also been found satisfactory to employ the simpler expedient of mechanical Swagelock test block cells in the evaluation of electrode and electrolyte materials and system operation. Test data derived with such apparatus are seen to be comparable to those obtained with the more fully developed laminated cells described in the foregoing examples.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed:

1. A rechargeable electrical energy storage system comprising in contiguity a positive electrode member, a negative electrode member, and a separator member interposed therebetween containing a fluid electrolyte comprising a pair of ion species of a dissociable salt characterized in that one of said electrode members comprises a first material capable of intercalating the cation of said species in response to the application of an electrical charge of a first polarity, and the other of said electrode members comprises a combination of a) a second material capable of adsorbing the anion of said species in response to the application of a contemporaneous electrical charge of opposite polarity, and b) a third material capable of yielding said cation species in response to the application of said contemporaneous electrical charge of opposite polarity, said third material being selected from the group consisting of lithiated transition metal oxides, sulfides, phosphates, and fluorides.

2. A storage system according to claim 1 wherein said cation species is selected from the group consisting of alkalies, alkaline earths, lanthanides, Y, Al, and Zn.

3. A storage system according to claim 1 wherein said anion species is selected from the group consisting of $PF_6$, $ClO_4$, $BF_4$, $CF_3SO_3$, and $AsF_6$.

4. A storage system according to claim 1 wherein said first electrode member material is selected from the group consisting of transition metal oxides, sulfides, phosphates, and fluorides, alkali and alkaline earth metal-alloying metals and compounds, and open-structured carbonaceous materials.

5. A storage system according to claim 2 wherein said cation species is lithium and said third electrode member material is a lithiated transition metal oxide intercalation compound.

6. A storage system according to claim 1 wherein said second electrode member material is selected from the group consisting of pseudocapacitor and double-layer capacitor electrode materials.

7. A storage system according to claim 4 wherein said third electrode member material is selected from the group consisting of lithiated transition metal oxide spinel compounds.

8. A storage system according to claim 7 wherein said first electrode member material is $Li_4Ti_5O_{12}$.

9. A storage system according to claim 6 wherein said second electrode member material is selected from the group consisting of high surface area activated carbon powder, foam, fiber, and fabric materials.

10. A storage system according to claim 1 wherein said electrolyte comprises a 0.5 M to 2.0 M solution of at least one said dissociable salt in an organic solvent selected from the group consisting of ethylene carbonate, dimethyl carbonate propylene carbonate diethoxyethane, diethyl carbonate, dimethoxyethane, sulfolane, and dipropyl carbonate and mixtures thereof.

11. A storage system according to claim 10 wherein said at least one dissociable salt is selected from the group consisting of $LiPF_6$, $LiClO_4$, $LiN(CF_3SO_2)_2$, $LiBF_4$, $LiCF_3SO_3$, and $LiAsF_6$.

12. A rechargeable hybrid battery/supercapacitor system comprising a positive electrode member, a negative electrode member, and a separator member interposed therebetween containing a fluid electrolyte comprising a pair of ion species of a dissociable salt characterized in that
   a) one of said electrode members comprises a first material capable of reversibly intercalating the cation of said species in response to the application of an electrical charge of a first polarity,
   b) the other of said electrode members comprises
      1) a second material capable of reversibly adsorbing the anion of said species in response to the application of a contemporaneous electrical charge of opposite polarity, and
      2) a third material capable of reversibly deintercalating said cation species in response to the application of said contemporaneous electrical charge of opposite polarity, said third material being selected from the group consisting of lithiated transition metal oxides, sulfides, phosphates, and fluorides,
   c) said separator member comprises a microporous layer having dispersed therein a non-aqueous solution of said dissociable salt, and
   d) each said member is bonded to one or more contiguous members at its respective interface to form a unitary laminate structure.

13. A hybrid system according to claim 12 wherein each of said electrode members is bonded to a respective electrically-conductive current collector element.

14. A hybrid system according to claim 12 wherein
   a) each of said electrode members comprises a polymeric matrix having dispersed therein the respective ion-intercalating and ion-adsorbing materials,
   b) said separator member layer comprises a polymeric membrane having dispersed therein a multiplicity of pores or voids, and
   c) said members are bonded by thermal adhesion at their polymeric surfaces.

15. A hybrid system according to claim 12 wherein said first electrode member material is selected from the group consisting of transition metal oxides, sulfides, phosphates, and fluorides, alkali and alkaline earth metal-alloying metals and compounds, and open-structured carbonaceous materials.

16. A hybrid system according to claim 12 wherein said second electrode member material is selected from the group consisting of pseudocapacitor and double-layer capacitor electrode materials and high surface area activated carbon powders, foams, and fibers.

17. A hybrid system according to claim 12 wherein said third electrode member material is selected from the group consisting of lithiated transition metal oxide intercalation compounds.

18. A hybrid system according to claim 12 wherein
   a) said first electrode member material comprises $Li_4Ti_5O_{12}$,
   b) said second electrode member material comprises a high surface area activated carbon,
   c) said third electrode member material comprises $LiMn_2O_4$, and
   d) said electrolyte comprises a 1 M solution of $LiPF_6$ in a 2:1 mixture of ethylene carbonate:dimethyl carbonate.

19. A method of improving the high energy charge capacity of a hybrid rechargeable electrical energy storage system comprising a separator member containing a fluid electrolyte comprising a pair of ion species of a dissociable salt interposed between a first electrode member comprising a first material capable of reversibly combining a first of said ion species in response to the application of an electrical charge of a first polarity and a second electrode member comprising a second material capable of reversibly adsorbing the second of said ion species in response to the application of a contemporaneous electrical charge of opposite polarity, said method comprising incorporating into said second electrode member a third material capable of reversibly yielding said first ion species in response to the application of said contemporaneous electrical charge of opposite polarity, said third material being selected from the group consisting of lithiated transition metal oxides, sulfides, phosphates, and fluorides.

20. A method according to claim 19 wherein
   a) said first ion species comprises lithium,
   b) said first electrode member material is selected from the group consisting of lithium intercalating and lithium alloying metals and compounds, and open-structured carbonaceous materials,
   c) said second electrode member material comprises a high surface area activated carbon, and
   d) said third electrode member material comprises a lithiated transition metal oxide intercalation compound.

* * * * *